US010019232B2

(12) United States Patent
Nystad

(10) Patent No.: US 10,019,232 B2
(45) Date of Patent: Jul. 10, 2018

(54) APPARATUS AND METHOD FOR INHIBITING ROUNDOFF ERROR IN A FLOATING POINT ARGUMENT REDUCTION OPERATION

(71) Applicant: ARM LIMITED, Cambridge (GB)

(72) Inventor: Jørn Nystad, Trondheim (NO)

(73) Assignee: ARM Limited, Cambridge (GB)

( * ) Notice: Subject to any disclaimer, the term of this patent is extended or adjusted under 35 U.S.C. 154(b) by 78 days.

(21) Appl. No.: 15/140,739

(22) Filed: Apr. 28, 2016

(65) Prior Publication Data

US 2016/0364209 A1 Dec. 15, 2016

(30) Foreign Application Priority Data

Jun. 15, 2015 (GB) .................................. 1510452.4

(51) Int. Cl.
G06F 7/483 (2006.01)
G06F 7/499 (2006.01)
(52) U.S. Cl.
CPC .......... G06F 7/49915 (2013.01); G06F 7/483 (2013.01)
(58) Field of Classification Search
None
See application file for complete search history.

(56) References Cited

U.S. PATENT DOCUMENTS

| 5,042,001 | A | * | 8/1991 | Brightman | ............... | G06F 7/544 |
| | | | | | | 708/490 |
| 7,346,642 | B1 | * | 3/2008 | Briggs | ...................... | G06F 1/02 |
| | | | | | | 708/497 |
| 8,990,278 | B1 | | 3/2015 | Clegg | | |

OTHER PUBLICATIONS

Daramy-Loirat et al., "CR-LIBM—A library of correctly rounded elementary functions in double-precision", Feb. 26, 2009, 163 pages.
Combined Search and Examination Report for GB1510452.4 dated Dec. 14, 2015, 5 pages.

* cited by examiner

Primary Examiner — Michael D. Yaary
(74) Attorney, Agent, or Firm — Nixon & Vanderhye P.C.

(57) ABSTRACT

An apparatus and method are provided for inhibiting roundoff error in a floating point argument reduction operation. The apparatus has reciprocal estimation circuitry that is responsive to a first floating point value to determine a second floating point value that is an estimated reciprocal of the first floating point value. During this determination, the second floating point value has both its magnitude and its error bound constrained in dependence on a specified value N. Argument reduction circuitry then performs an argument reduction operation using the first and second floating point values as inputs, in order to generate a third floating point value. The use of the specified value N to constrain both the magnitude and the error bound of the second floating point value causes roundoff error to be inhibited in the third floating point value that is generated by the argument reduction operation. This enables such an argument reduction operation to be used as part of a more complex computation, such as a logarithm computation, with the inhibiting of roundoff error in the argument reduction result allowing the overall result to exhibit small relative error across the whole representable input range.

19 Claims, 8 Drawing Sheets

IF V IS NEAR 1

AT STEP 1:   $V = x1 * 2^0$
             $= \sim 1 \times 2^0 \quad \therefore S = 0$   — 50

AT STEP 2:   P CHOSEN TO BE 1
             $Q = \log 1 = 0$   — 55

AT STEP 3:   $X = (1 * \sim 1) - 1 = \sim 0$   — 60

AT STEP 4:   SINCE $X = \sim 0$, TAYLOR SERIES IS DOMINATED BY FIRST TERM, SO NO CANCELLATION ERRORS OR THE LIKE TO REDUCE RELATIVE PRECISION   — 65

AT STEP 5:   SINCE S AND Q ARE ZERO COMPUTATION OF Y SIMPLIFIED   — 70

FIG_2

$$pow(a,b) = e^{2(b * \log_2 a)}$$

$\log_2 a$ NEEDS INCREASED PRECISION THAN AVAILABLE WITH REGULAR FP 32 VALUE

IN STEP 4 SELECT NUMBER OF TAYLOR TERMS HAVING REGARD TO REQUIRED PRECISION AND COMPUTE T — 300

DURING STEP 5 USE KAHAN SUMMATION WHEN COMPUTING Y TO KEEP TRACK OF SUM AND ASSOCIATED ERROR AS TWO FP VALUES (EFFECTIVELY INCREASING PRECISION) — 305

APPARATUS AND METHOD FOR INHIBITING ROUNDOFF ERROR IN A FLOATING POINT ARGUMENT REDUCTION OPERATION

This application claims priority to GB Patent Application No. 1510452.4 filed 15 Jun. 2015, the entire content of which is hereby incorporated by reference.

BACKGROUND

The present technique relates to an apparatus and method for inhibiting roundoff error in a floating point argument reduction operation.

There are a number of floating point computations used in modern data processing systems that require specified degrees of accuracy in the results obtained when performing those computations. One example is a floating point logarithm computation. For example in the field of graphics processing units (GPUs), there are several application programming interfaces that typical GPU designs must support, where logarithm functions are required. These functions are typically base-2 and base-e (natural) logarithms, that may for example take a single precision (FP32) floating point input value, and produce a single precision floating point result. It is often the case that these logarithm functions are required to exhibit small relative error for the whole representable input range.

One known approach for implementing a logarithm function employs as one of its steps an argument reduction step. To ensure logarithm results are produced with the required accuracy, it is desirable for such a reduction step to be performed without introducing roundoff error. However, known techniques for performing an argument reduction step without introducing roundoff error rely heavily on multi-precision arithmetic, which significantly increases the cost and complexity of the circuitry.

An alternative approach for performing a logarithm operation may employ a power-of-two scaling that reduces the input value to a range from 0.5 to 1, and then use a piecewise-cubic function to approximate the logarithm, with the piecewise-cubic function provided from a lookup table. However, such an approach can result in the need for a very large and irregular lookup table to provide sufficiently-accurate piecewise-cubic functions for input values close to 1.

It would hence be desirable to provide a technique that can be used when performing computations such as logarithm computations, that alleviates the above described issues.

SUMMARY

In one example configuration, there is provided an apparatus comprising: reciprocal estimation circuitry, responsive to a first floating point value, to determine a second floating point value that is an estimated reciprocal of the first floating point value, the second floating point value having both its magnitude and its error bound constrained in dependence on a specified value N; and argument reduction circuitry to perform an argument reduction operation using the first and second floating point values as inputs, in order to generate a third floating point value; the use of the specified value N to constrain both the magnitude and the error bound of the second floating point value causing roundoff error to be inhibited in the third floating point value that is generated by the argument reduction operation.

In another example configuration, there is provided a method of inhibiting roundoff error in a floating point argument reduction operation, comprising: responsive to a first floating point value, determining a second floating point value that is an estimated reciprocal of the first floating point value, and during said determination constraining both a magnitude and an error bound of the second floating point number in dependence on a specified value N; and employing argument reduction circuitry to perform an argument reduction operation using the first and second floating point values as inputs, in order to generate a third floating point value; wherein the use of the specified value N to constrain both the magnitude and the error bound of the second floating point value causes roundoff error to be inhibited in the third floating point value that is generated by the argument reduction operation.

In a yet further example configuration, there is provided an apparatus comprising: reciprocal estimation means for determining, in response to a first floating point value, a second floating point value that is an estimated reciprocal of the first floating point value, the second floating point value having both its magnitude and its error bound constrained in dependence on a specified value N; and argument reduction means for performing an argument reduction operation using the first and second floating point values as inputs, in order to generate a third floating point value; the use of the specified value N to constrain both the magnitude and the error bound of the second floating point value causing roundoff error to be inhibited in the third floating point value that is generated by the argument reduction operation.

BRIEF DESCRIPTION OF THE DRAWINGS

The present technique will be described further, by way of example only, with reference to embodiments thereof as illustrated in the accompanying drawings, in which:

FIG. 2 is a flow diagram illustrating how the process of FIG. 1 operates when the input floating point value has a value close to 1, in accordance with one embodiment;

FIG. 6 is a flow diagram illustrating how steps 4 and 5 of FIG. 1 may be adapted when providing an enhanced precision mode in accordance with one embodiment;

DESCRIPTION OF EMBODIMENTS

Figure 1:
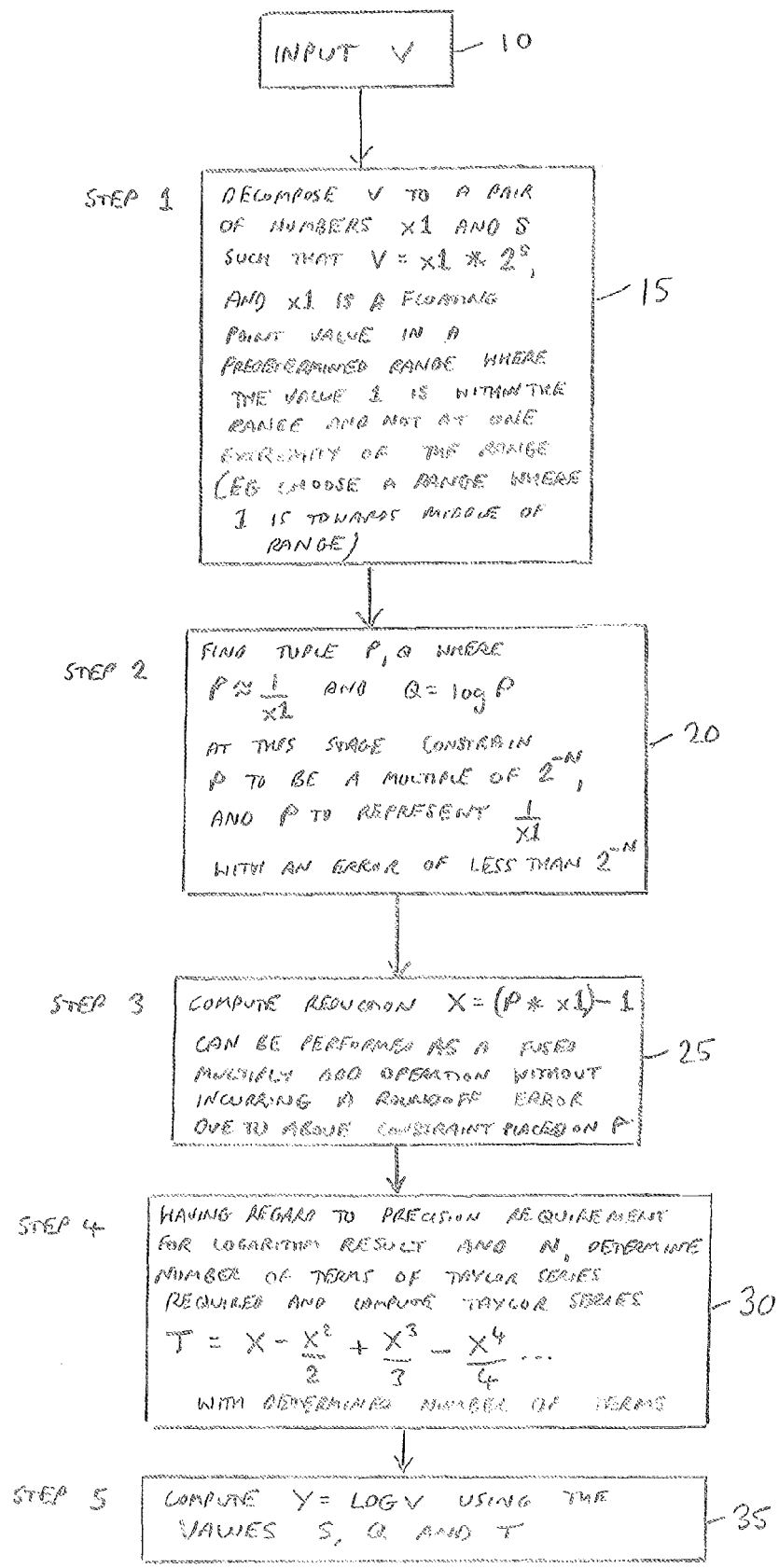
FIG. 1 is a flow diagram illustrating a floating point logarithm computation performed in accordance with one embodiment.

Before discussing the embodiments with reference to the accompanying figures, the following description of embodiments is provided.

In accordance with one embodiment an apparatus is provided that comprises reciprocal estimation circuitry to determine a second floating point value that is an estimated reciprocal of an input first floating point value. In accordance with the described embodiment, the second floating point value has both its magnitude and its error bound constrained in dependence on a specified value N. Argument reduction circuitry then performs an argument reduction operation using the first and second floating point values as inputs, in order to generate a third floating point value. In accordance with the described embodiment, the use of the specified value N to constrain both the magnitude and the error bound of the second floating point value causes roundoff error to be inhibited in the third floating point value that is generated by the argument reduction operation.

Such an approach provides a very efficient mechanism for inhibiting roundoff error in the result of an argument reduction operation. Accordingly, such an apparatus can be used to implement part of a larger floating point computation that can make use of such an argument reduction result, for example as part of a floating point logarithm computation.

The above described technique does not require multi-precision arithmetic to inhibit roundoff error, but instead takes advantage of certain properties of floating point representation which ensure that, by constraining the magnitude and the error bound of the second floating point value in the manner described, this ensures that roundoff error is inhibited in the result of the argument reduction operation.

There are a number of ways in which the specified value N can be used to constrain both the magnitude and the error bound of the second floating point value. In one embodiment, the second floating point value has its magnitude constrained to be a multiple of $2^{-N}$ and has its error bound constrained so as to represent the reciprocal of the first floating point value with an error of less than $2^{-N}$, where N is a positive integer. It has been found that the value of N can be selected as desired, but in one particular example embodiment N is chosen to be equal to 5.

The argument reduction operation can take a variety of forms, but in one embodiment is a multiply-accumulate operation. There are a number of ways to perform such a multiply-accumulate operation, but in one embodiment the argument reduction circuitry comprises fused multiply-accumulate circuitry, also referred to herein as fused multiply-add (FMA) circuitry. By enabling fused multiply-accumulate circuitry to perform a multiply-accumulate operation without introducing any roundoff error, this allows improved control of error analysis and good numeric stability for resulting computations that incorporate such an argument reduction step, at low cost.

There are a number of ways in which the reciprocal estimation circuitry can determine the second floating point value. In one embodiment, the apparatus further comprises a lookup table storage having a plurality of entries storing floating point values, the reciprocal estimation circuitry being arranged to access an entry in the lookup table storage using specified bits of the first floating point value, and to use the floating point value in the accessed entry to form the second floating point value. Given the earlier-mentioned constraints placed on the magnitude and the error bound of the second floating point value, this enables the lookup table storage to be implemented relatively cheaply. For example, in one embodiment there is for every possible input number two possible choices of the second floating point value that match the above-mentioned constraints. This allows an appropriate second floating point value to be selected fairly cheaply, for example using a specified subset of bits of the first floating point value as an index into the lookup table.

In one embodiment, the specified bits of the first floating point value used to access the entry are the most significant N+1 bits of a fraction portion of the first floating point value. Taking as a specific example the earlier mentioned example where N equals 5, this means that only six bits of the fraction are required, resulting in a lookup table with $2^6$ entries, and in one embodiment it has been found that only about five bits per entry are required to represent the second floating point value.

In one embodiment, the first floating point value is not the originally provided input floating point value for the computation, but instead input adjustment circuitry is used to determine the first floating point value from the input floating point value, such that the first floating point value is within a specified range. In particular, in one embodiment the apparatus further comprises input adjustment circuitry to perform an adjustment operation on an input floating point value to produce the first floating point value and a scaling factor, the scaling factor being chosen such that the first floating point value is within a specified range, where the boundary values of the specified range are other than 1, and a value of 1 is within the specified range. By ensuring that the value "1" is within the range but not at one boundary of the range, it has been found that this enables the result obtained by the argument reduction operation to be used in computations such as logarithm computations in a way that ensures logarithm results are produced with small relative error across the whole representable input range. In contrast, if the value of 1 did form one of the boundary values of the specified range, then if the input floating point value was slightly smaller than 1, this could cause a large cancellation error to occur between some of the inputs provided to the final logarithm computation block, which would adversely affect the accuracy of the overall logarithm result.

Ideally, the specified range is chosen such that the value "1" is well within the range. In one particular embodiment, the value of 1 is a median value within the set of floating point values representable within the specified range. Having regard to how floating point numbers are represented, then one example specified range that represents the value of 1 as the median value is a range from 0.75 to 1.5.

In one embodiment, the above described apparatus is supplemented with additional components to enable a logarithm of the input floating point value to be determined. In particular, in one embodiment the apparatus further comprises computation circuitry to perform a computation operation using the third floating point value as an input, in order to generate a fourth floating point value; and logarithm determination circuitry to generate a final result representing a logarithm of the input floating point value using the fourth floating point value as an input.

The computation circuitry can be arranged in a variety of ways, but in one embodiment performs a Taylor series computation, where the number of terms in the Taylor series is dependent on a specified precision for the final result and the specified value N. The specified precision will depend on embodiment. For example, the precision required for OpenCL will typically be different to the precision required for OpenGL. In one particular implementation where N=5, it has been found that a degree-4 Taylor series will satisfy OpenCL's precision requirements and a degree-3 Taylor series will satisfy OpenGL's precision requirements. A degree-N Taylor series is a series that is truncated immediately after the $X^N$ term of the Taylor series.

Whilst in any particular implementation the specified precision may be fixed, in one embodiment it may be configurable. In particular, in one embodiment the computation circuitry is configurable in response to a control signal indicative of the specified precision to perform the Taylor series with an appropriate number of terms for that specified precision.

In one particular embodiment, the appropriate number of terms for the Taylor series is dependent on the specified precision and a maximum possible magnitude of the third floating point value. The maximum possible magnitude of the third floating point value is dependent on the reciprocal error bound, which as mentioned earlier is dependent on N, multiplied with the upper bound of the specified range of the first floating point value, resulting for example from the input adjustment operation described earlier (which in the earlier mentioned example where the range extends from 0.75 to 1.5 gives an upper bound of 1.5).

In one embodiment, the reciprocal estimation circuitry is further arranged to determine at least one further floating point value representing a logarithm of the second floating point value, said at least one further floating point value forming a further input to the logarithm determination circuitry. In particular, in one embodiment both the further floating point value and the result of implementing the Taylor series computation are combined during the final determination of the logarithm result.

In one embodiment, the accuracy of the at least one further floating point value will affect the overall accuracy of the logarithm result. Accordingly, in one embodiment the at least one further floating point value represents the logarithm of the second floating point value to an accuracy sufficient to accommodate a worst case specified precision for the final result generated by the logarithm determination circuitry. In one particular embodiment, it has been found that this condition can be met by representing the logarithm of the second floating point value as a pair of single precision floating point values.

There are a number of ways in which the at least one further floating point value (for example the pair of values mentioned above) can be determined by the reciprocal estimation circuitry. However, in one embodiment the apparatus further comprises an additional lookup table storage referenced by the reciprocal estimation circuitry in order to obtain the at least one further floating point value. There are a number of ways in which the additional lookup table storage can be indexed. For example, it could be indexed using a certain number of bits of the first floating point value. However, in an alternative embodiment the reciprocal estimation circuitry is arranged to access the additional lookup table storage using the determined second floating point value. Hence, in such an embodiment the second floating point value is first determined (for example by using the lookup table storage discussed earlier), and then that second floating point value is used to index into the additional lookup table storage in order to determine the one or more floating point values used to represent the logarithm of the second floating point value. In one embodiment, it has been found that such an approach enables the number of entries in the additional lookup table storage to be reduced relative to the number of entries in the first lookup table used to compute the second floating point value.

In one embodiment, the final computation performed by the logarithm determination circuitry uses not only the result of the Taylor series computation and the at least one further floating point value mentioned above, but also receives the scaling factor as a further input. Based on these three input values, the logarithm result can then be determined, and due to the techniques described earlier the logarithm result produced will exhibit small relative error for the whole representable input range.

In one embodiment, an enhanced precision mode is provided. In particular, in the enhanced precision mode, the logarithm determination circuitry is configured to perform a series of addition operations on input values to the logarithm determination circuitry using Kahan summation, to produce as the final result a sum floating point value representing the sum and an error floating point value representing an error in the sum. By using Kahan summation in such a way, then the precision of the two floating point values in the final result effectively increases the precision of the result.

There are a number of situations where the enhanced precision mode may be used. However, in one particular embodiment, the enhanced precision mode is selected when determining as the final result $\log_2 a$, where a is the input floating point value, and the final result is provided for use in the computation pow $(a,b)=e^{2(b \times \log_2 a)}$.

Such a pow (a,b) function may be required in a variety of graphics processing operations, and typically requires the result to be obtained with somewhat tighter error bounds than for other logarithm computations. For example, in OpenCL, this requires the $\log_2(a)$ result to be computed with substantially more precision than for a regular single precision logarithm computation. By using the above described enhanced precision mode, the requirement for such an increased precision can be readily accommodated within the apparatus.

Particular embodiments will now be described with reference to the Figures.

Before discussing the embodiments in detail, the following provides a brief summary of floating point number formats. Processors for performing arithmetic operations on floating point numbers are known. In floating point representation, numbers are represented using a significand 1.F, an exponent E and a sign bit S. The sign bit S represents whether the floating point number is positive or negative, the significand 1.F represents the significant digits of the floating point number, and the exponent E represents the position of the radix point (also known as a binary point) relative to the significand. By varying the value of the exponent, the radix point can "float" left and right within the significand. This means that for a predetermined number of bits, a floating point representation can represent a wider range of numbers than a fixed point representation (in which the radix point has a fixed location within the significand). However, the extra range is achieved at the expense of reduced precision since some of the bits are used to store the exponent. Sometimes, a floating point arithmetic operation generates a result with more significant bits than the number of bits used for the significand. If this happens then the result is rounded to a value that can be represented using the available number of significant bits.

Figure 7:
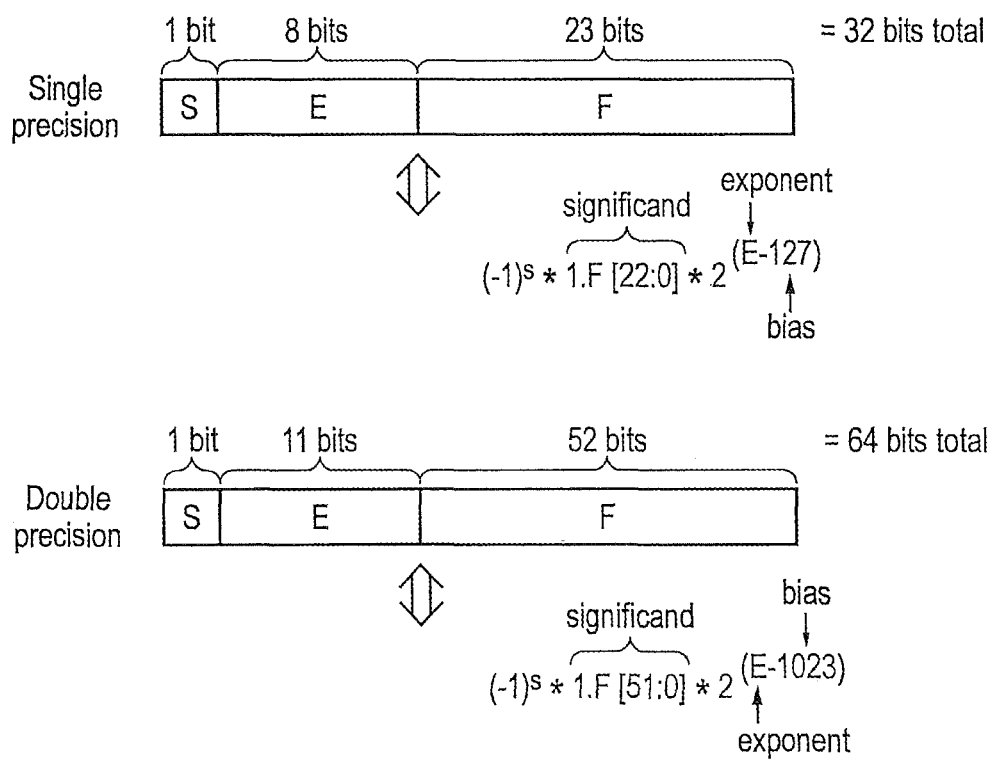
FIG. 7 illustrates single and double precision floating point formats that may be used within the apparatus of the described embodiments.

FIG. 7 shows how floating point numbers may be stored within a register or memory. In a single precision (SP) representation (also referred to herein as FP32), 32 bits are used to store the floating point number. One bit is used as the sign bit S. eight bits are used to store the exponent E, and 23 bits are used to store the fractional portion F of the significand 1.F. The 23 bits of the fractional portion F, together with an implied bit having a value of one, make up a 24-bit significand 1.F. The radix point is initially assumed to be placed between the implied bit and the 23 stored bits of the significand. The stored exponent E is biased by a fixed value 127 such that in the represented floating point number the radix point is shifted left from its initial position by E-127 places if E-127 is negative (e.g. if E-127=–2 then a significand of 1.01 represents 0.0101), or right from its initial position by E-127 places if E-127 is positive (e.g. if E-127=2 then a significand of 1.01 represents 101). The bias is used to make it simpler to compare exponents of two floating point values as then both negative and positive shifts of the radix point can be represented by a positive value of the stored exponent E. As shown in FIG. 7, the stored representation S[31], E[30:23], F[22:0] represents a number with the value $(-1)^S*1.F[22:0]*2^{(E-127)}$. A single-precision floating point number in this form is considered to be "normal". If a calculated floating point value is not normal (for example, it has been generated with the radix point at a position other than between the left-most two bits of the significand), then it is normalized by shifting the significand left or right and adjusting the exponent accordingly until the number is of the form $(-1)^S*1.F[22:0]*2^{E-127}$. Special case handling (e.g. exception handlers or dedicated hardware) is provided to handle numbers that cannot be represented as a normal floating point value.

A double precision (DP) format (also referred to herein as FP64) may also be provided in which the significand and exponent are represented using 64 stored bits. The 64 stored bits include one sign bit, an 11-bit exponent and the 52-bit fractional portion F of a 53-bit significand 1.F. In double precision format the exponent E is biased by a value of 1023. Thus, in the double precision format a stored representation S[63], E[62:52], F[51:0] represents a floating point value $(-1)^S*1.F[51:0]*2^{E-1023}$.

The embodiments described hereafter are generally applicable to SP or DP numbers.

FIG. 1 is a flow diagram of a logarithm computation process performed in accordance with one embodiment. Firstly, at step 10, an input floating point operand V is received. Then, at step 15, also referred to herein as step 1, the input operand V is decomposed into a pair of numbers x1 and S, such that the input floating operand V is equal to $x1 \times 2^S$. Effectively at this point a scaling operation is performed so that the resultant floating point value x1 is in a predetermined range such that the value 1 is within the range and not at one extremity of the range. In one particular embodiment, the scaling is performed such that x1 is within the range from 0.75 to 1.5. Having regard to how floating point numbers are represented, such a range ensures that the value of 1 is a median value within the range. It is possible to perform the scaling so that x1 lies within a different range, provided that the number 1 is within the range and not at the end of the range. In particular, it has been found that if the value of 1 is at the end of the range, as for example would be the case for a range extending from 1 to 2, this would cause logarithms computed for input values slightly smaller than 1 to exhibit a large cancellation error between two values S and Q used in the final computation of the logarithm value, which could introduce significant errors into the result. In contrast, by specifically setting the range such that 1 is not at the end of the range, this ensures that S is exactly zero in a neighbourhood on both sides of 1 and therefore cannot cause cancellation.

Following step 15, then at step 20 (also referred to herein as step 2) a tuple of values P, Q are computed where P is the approximate reciprocal of x1, and Q is equal of log P. In accordance with the described embodiment, the selection of the value P is constrained so that both its magnitude and its error bound are constrained in dependence on a predetermined value N. In particular, in the described embodiment the magnitude of P is constrained to be a multiple of $2^{-N}$, and to also represent the approximate reciprocal of x1 with an error of less than $2^{-N}$. Typically N can be chosen to be any positive integer, but in one particular example is chosen to be 5. It has been found that by placing the above constraints on the magnitude and error bound of P, for an arbitrary value of N, it is possible to select the value of P in such a way that a subsequent reduction operation performed in step 3 (to be discussed further below) can be performed without incurring roundoff error, and with no multi-precision arithmetic needed.

In particular, as shown at step 25, the reduction performed involves computing a value X that is equal to a multiplication of x1 with P, with 1 then being subtracted from that intermediate result. Due to the constraints placed in step 2, it has been found that this reduction operation, which takes the form of a multiply accumulate operation, can be formed within a fused multiply add circuit without incurring roundoff error.

Considering the example where N is equal to 5, then the fact that no roundoff error is introduced is demonstrated by analysis of the following two cases.

The first case is the case where x1>=1. In FP32, i.e. SP floating point format, this will cause x1 to be representable as a value of the form $K*2^{-23}$, where K is at most $1.5*2^{23}$. In this case, the product $X=(P*x1)-1$ is a multiple of $(2^{-23}/32)=2^{-28}$. Numbers that are multiples of $2^{-28}$ can be represented exactly in FP32 format as long as they have an absolute value smaller than $2^{-4}$. Now, given that $P=(1/x1+E)$ for some error term E, where E has an absolute value smaller than $2^{-5}$, and x1 is in the range [1, 1.5), it follows that:

$$X=P*x1-1$$

$$X=(1/x1+E)*x1-1$$

$$X=x1*E$$

$$|X|<1.5*2^{-5}$$

$$|X|<2^{-4}$$

The second case is the case where x1<1. In FP32 format, this will cause x1 to be representable as a value of the form $K*2^{-24}$, where K is at most $2^{24}$. In this case, the product $X=P*x1-1$ is a multiple of $(2^{-24}/32)=2^{-29}$. Numbers that are multiples of $2^{-29}$ can be represented exactly in FP32 as long as they have an absolute value smaller than $2^{-5}$. Now, given that $P=(1/x1+E)$ for some error term E, where E has an absolute value smaller than $2^{-5}$, and x1 is in the range [0.75, 1), it follows that:

$$X=P*x1-1$$

$$X=(1/x1+E)*x1-1$$

$$X=x1*E$$

$$|X|<2^{-5}$$

These two inequalities show that the selection of P in accordance with the above mentioned constraints on both its magnitude and its error bound will always allow computation of the value X without introducing roundoff error.

Given that P is a multiple of $2^{-5}$ and must represent 1/x1 with an error of at most $2^{-5}$, there is for every possible input number two possible choices for P. This allows P to be selected fairly cheaply in step 20: one example implementation uses the top 6 fraction bits of x1 to index into a lookup table with $2^6$ entries and about 5 bits per entry.

Following step 25, then the number of required terms of a Taylor series is determined having regard to the precision requirement for the logarithm result and the chosen value of N, and then a value T is computed using the value X and the equation shown in step 30 (also referred to herein as step 4). The number of terms will be dependent on the required precision. For example, when using single precision floating point numbers, and selecting N to be equal to 5, this results in one embodiment in a requirement for a degree-4 Taylor series in order to satisfy OpenCLs precision requirements, and a degree-3 Taylor series to satisfy OpenGLs precision requirements. OpenCL also has special half-precision functions for which a degree-1 Taylor series is sufficient. As used herein, a degree-N series is the series that is truncated immediately after the $X^N$ term. Hence a degree-4 Taylor series is terminated after the $(X^4)/4$ term.

A calculation of the required number of terms can be made based on the desired precision and a maximum possible magnitude of the value X. The maximum magnitude of X is given by the reciprocal error bound (i.e. in the described embodiment $2^{-N}$) multiplied by the upper bound of the predetermined range of x1, i.e. 1.5 in the earlier mentioned example. In particular, the error in the computation T will be dominated by the first Taylor series term that is not included. Accordingly, the error in a candidate term to omit can be computed based on the above information, and if that error is less than the error allowed by the desired precision, then that term can be omitted, and the Taylor series can be truncated at the immediately preceding term.

Once the value T has been computed, then at step 35 (also referred to herein as step 5) the logarithm result Y can be computed using the values of S, Q and T. In particular, in one embodiment the following computations are performed dependent on whether the logarithm is base 2, base e or base 10:

IF BASE 2 $Y=S-Q+T^*\log_2 e$

IF BASE e $Y=T-Q+S^*\ln_e 2$ (I.E. NATURAL LOG)

IF BASE 10 $Y'=T-Q+S^*\ln_e 2$

AND $Y=Y'^*\log_{10} e$

The above approach provides a particularly efficient mechanism for computing a logarithm result with a small relative error for the whole representable input range. As mentioned previously, some known prior art techniques have particularly struggled to do this for input numbers close to 1. However, FIG. 2 illustrates how the process of FIG. 1 operates when the input value V is close to 1. In particular, at step 50, which corresponds with step 1 of the process, no scaling will be required given that V is approximately equal to 1, and accordingly x1 will be approximately equal to 1 and S is set to 0. At step 55, corresponding to step 2, given that x1 is approximately equal to 1, P can be chosen to be 1. This in turn means that Q is 0. Accordingly, at this point both Q and S are 0. As a result, the only term that contributes to the logarithm is the Taylor series result T, and the only sources of error are the errors that result from roundoff and series truncation. However, as shown at step 60 in FIG. 2, which corresponds to step 3, the value X will be fairly close to 0. This means that the result of the Taylor series computation T is dominated by the first term, meaning that there are no cancellation errors or similar problems present that can reduce the relative precision. This enables a computation of the logarithm result for input values close to 1 to whichever relative precision is desired by just computing the appropriate number of Taylor terms.

In particular, as shown at step 65 in FIG. 2, which corresponds to step 4, the Taylor series computation results in no cancellation errors that will reduce the relative precision, and then at step 70, which corresponds to step 5, the computation of the logarithm result Y is significantly simplified due to both S and Q being equal to 0. Such an approach hence provides an elegant and low cost solution for computing accurate logarithm results across the entire representable range, which is particularly efficient when computing the logarithm of input values close to 1.

For other input numbers that are not so close to 1, there is a second source of errors, namely due to the value Q. In one embodiment, the value Q is obtained from a lookup table, as indeed is the value P. In one particular embodiment, as will be discussed later with reference to FIG. 4, the obtained value of P is used as an input to the lookup table to obtain the value Q. Further, in one particular implementation the first lookup table used to output the value of P only needs to return 24 different P values, and as such there is only a need for a 24-entry lookup table for Q.

However Q is computed, the precision of the overall logarithm computation for input values not close to 1 is limited by the precision of the Q value provided. Accordingly, Q must be represented precisely enough to accommodate the worst-case precision needed by the logarithm result. In one particular implementation it has been found that a suitable level of precision can be obtained by storing Q in a lookup table as a pair of single precision floating point values.

Figure 3:
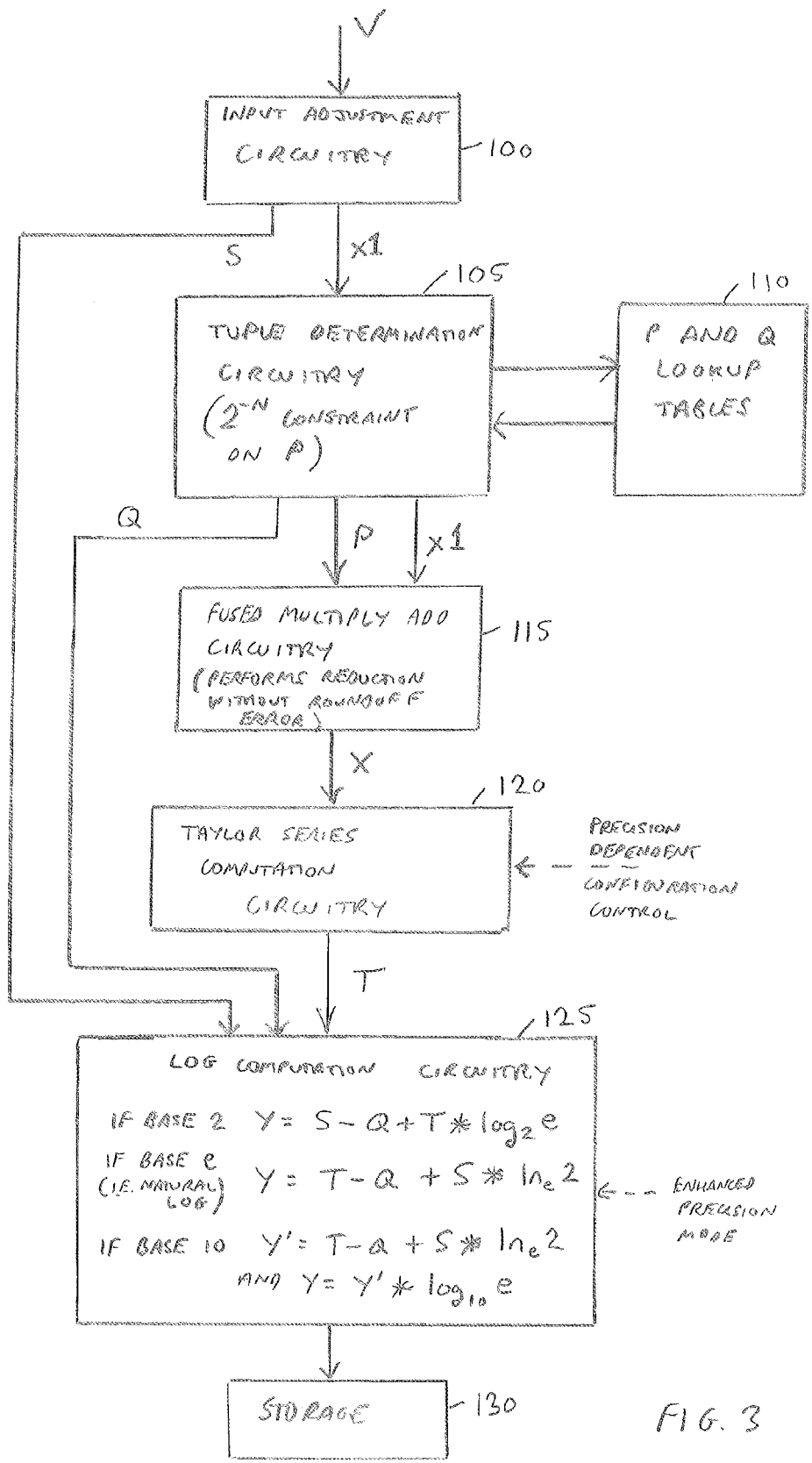
FIG. 3 illustrates circuitry that may be used to perform the floating point logarithm computation in accordance with one embodiment.
Figure 4:
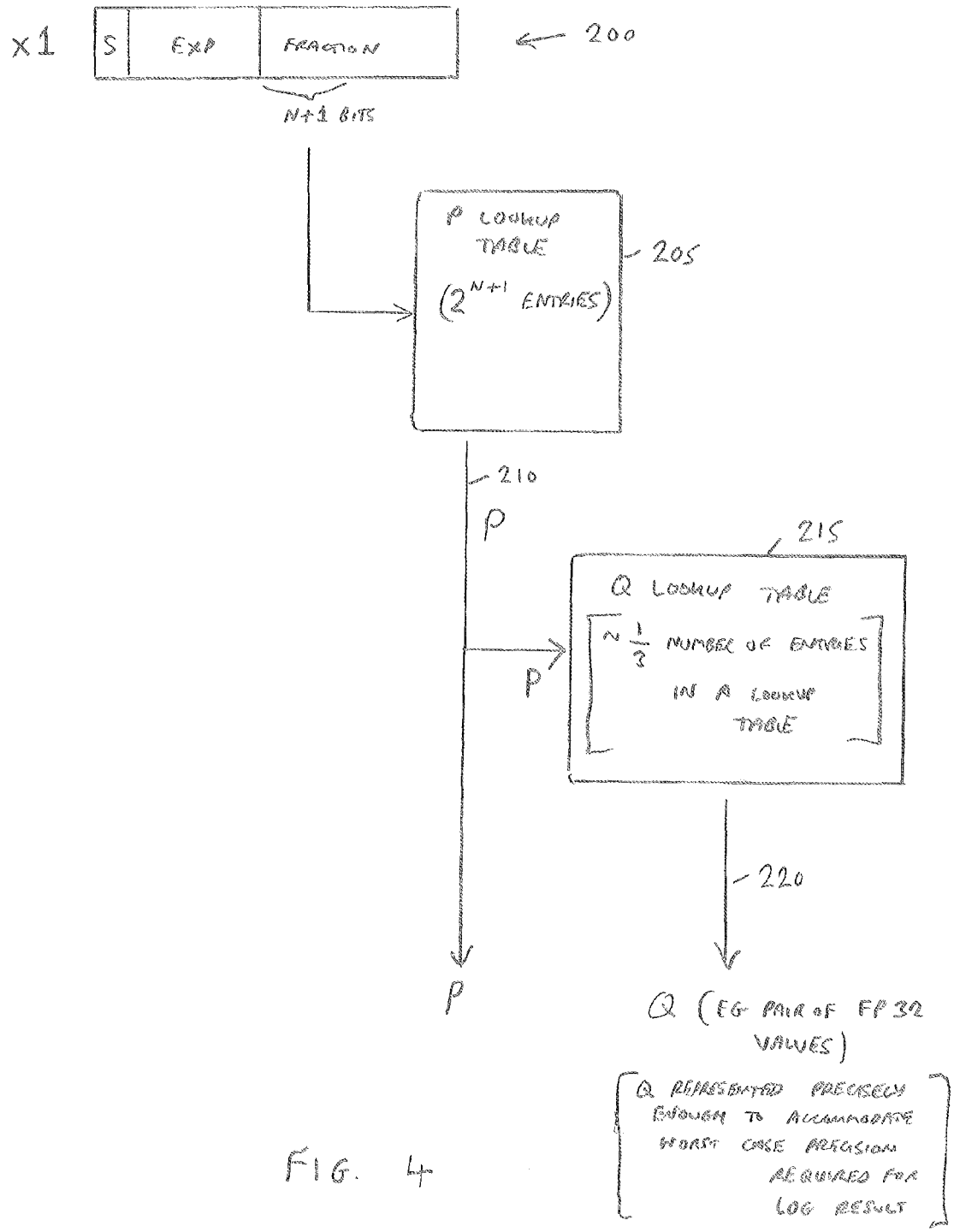
FIG. 4 is a flow diagram illustrating how lookup tables may be employed when performing step 2 of FIG. 1 in accordance with one embodiment.

FIG. 3 is a block diagram of an apparatus that may be used in one embodiment to implement the above described technique. Input adjustment circuitry 100 is arranged to receive the input value V, and to perform the decomposition/scaling process of step 15 of FIG. 1 in order to generate the values x1 and S. The value of S is forwarded to the log computation circuitry 125 used to perform the final log result computation (or stored in a storage element for later access by the log computation circuitry 125). In addition, the value x1 is forwarded to tuple determination circuitry 105 which is arranged to reference lookup tables for the values P and Q based on the received value x1. The manner in which the lookup tables are populated is such that the earlier mentioned constraints on the magnitude and error bound of P are met, namely that the magnitude is a multiple of $2^{-N}$ and has an error bound of less than $2^{-N}$. There are a number of ways in which the lookup tables can be indexed based on the value x1. However, one embodiment is shown in FIG. 4.

In particular, the value x1 200 consists of sign, exponent and fraction portions. In one embodiment, the most significant N+1 bits of the fraction are used to index into the P lookup table 205. Accordingly, the P lookup table will have $2^{N+1}$ entries, and will output a corresponding P value over path 210. In one particular embodiment where N is 5, it will be appreciated that the most significant six bits of the fraction are used to index into the lookup table 205, and accordingly the lookup table 205 will have $2^6$ entries. In one embodiment, it has been found that there will only be 24 different P values, which can readily be identified by having only five bits per entry. In particular, considering the earlier mentioned embodiment where during step 15 x1 is constrained to be within the range from 0.75 to 1.5, this means that the reciprocal value will be between 0.67 (i.e. 1/1.5) and 1.33 (i.e. 1/0.75). The reciprocal value is also constrained to be a multiple of $2^{-5}$, and as a result the reciprocal value can only have about $(1.33-0.67)*2^5$ different values, i.e. a little over 20 different values.

In particular, if one enumerates all multiples of $2^{-5}$ values from 0.65625 to 1.34375 (the closest multiples of $2^{-5}$ exceeding the above range of 0.67 to 1.33), the entire range has 23 entries. 24 is easier to work with, and 32 is even easier. With five bits per entry, up to 32 different values can be specified so five bits per entry is sufficient in such an embodiment.

A FP32 number can be constructed from this 5-bit number for example by the following technique:

a) If the top bit is clear, then the number is in the range 0.5 . . . 1, and can be constructed with an exponent of 126 and a significand of 1.nnnn0000000000000000000 (that is, the bottom 4 bits of the number form the top 4 fractional-bits of the significand.

b) If the top bit it set, then the number is in the range 1 . . . 1.5, and can be constructed with an exponent of 127 and a significand of 1.0nnnn000000000000000000 (that is, the top fractional-bit of the significand is 0, and the bottom 4 bits of the number form the next 4 bits of the significand.

In the embodiment shown in FIG. 4, the output value of P (i.e. the five bit output) is used to index into the Q lookup table 215. In the earlier mentioned example where there are only 24 different P values, it will be appreciated that the Q lookup table only needs to have 24 entries. More generally, it has been found that the Q lookup table 215 can be provided with approximately a third the number of entries in the P lookup table 205.

However, as mentioned earlier, the precision of the overall logarithm computation may be limited by the precision of the value Q provided in the lookup table, so Q must be represented precisely enough to accommodate the worst case precision needed. In one embodiment, it has been found that it is sufficient to store Q as a pair of single precision floating point values within the lookup table. The indexed value of Q is then output over path 220.

As shown in FIG. 3, the determined value of Q is forwarded to the log computation circuitry 125 (or stored in a storage element for later access by the log computation circuitry 125), whilst the determined value of P is input to the fused multiply add circuitry 115, also referred to herein as fused multiply accumulate circuitry. The fused multiply add circuitry is arranged to perform the reduction computation of step 25 of FIG. 1, using the inputs P and x1. For the reasons discussed earlier, the resulting value X is obtained without any roundoff error, and is then provided to the Taylor series computation circuitry 120. The circuitry 120 may be fixed to compute a predetermined number of Taylor series terms when evaluating the Taylor series result T, for example in situations where the apparatus is always used to generate the logarithm result with the same precision. However, as mentioned earlier, the precision required may vary dependent on a number of factors, and accordingly in one embodiment the Taylor series computation circuitry 120 may be responsive to a configuration control signal that is dependent on the required precision, in order to modify the number of Taylor series terms computed.

Figure 5:
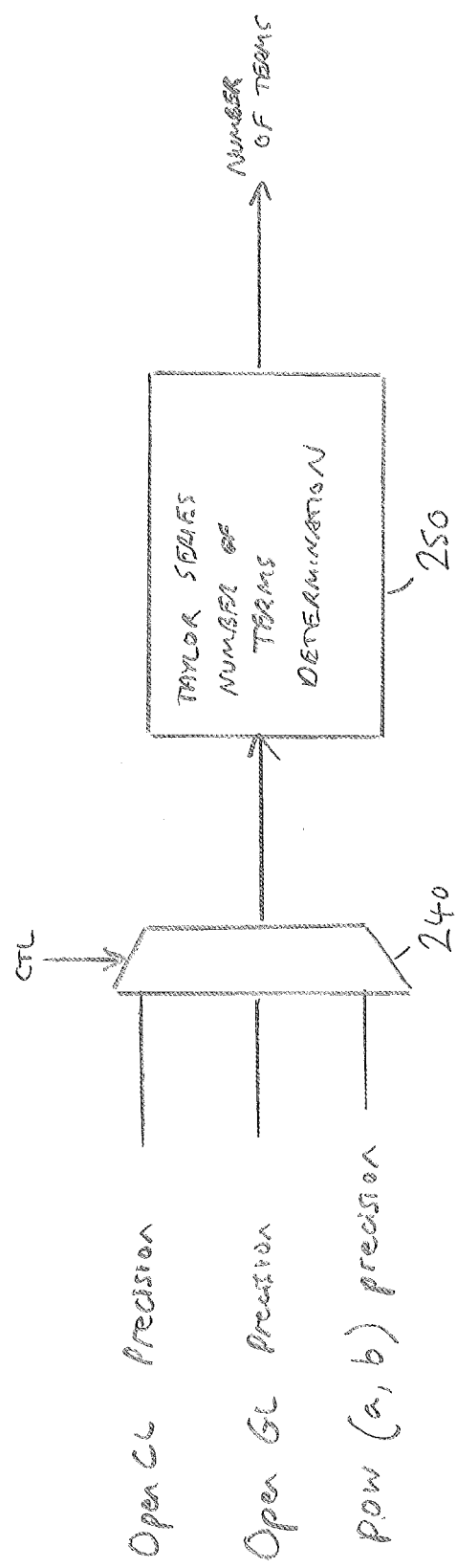
FIG. 5 illustrates configuration circuitry that may be used to configure the number of terms calculated by the Taylor series computation circuitry of FIG. 3 in accordance with one embodiment.

In one embodiment, the configuration control may be provided by the circuitry of FIG. 5. In particular, a multiplexer 240 may be provided with a number of required precision values, with one of those values being forwarded to a Taylor series number of terms determination circuit 250 based on a control signal to the multiplexer 240. For any input precision, the Taylor series number of terms determination circuitry will then determine the number of terms of the Taylor series required, and issue a control signal to the circuitry 120. As discussed earlier, the number of terms of the Taylor series required will be dependent on the specified precision and a maximum possible magnitude of the value X. The maximum possible value of X is given by the reciprocal error bound (the earlier mentioned $2^{-N}$ constraint) multiplied by the upper bound of the predetermined range of x1 (which in the specific example mentioned earlier is 1.5). The error in the value T generated by the Taylor series computation circuitry 120 will be dominated by the first term that is not included, and accordingly the error associated with such a candidate term can be determined based on the above information, in order to determine the appropriate first term to exclude, and accordingly the number of terms to be computed.

In one embodiment the number of terms computations performed by element 250 can be performed offline for a number of required precisions, with the results stored in a lookup table accessed to identify the required number of terms for a specified precision.

Once the value T has been computed, then it is output to the log computation circuitry 120 which performs one of the computations shown in box 125 using the inputs S, Q and T, with the actual computation performed being dependent on the base of the logarithm computation. The output value of Y may then be forwarded for storage in a storage element 130, from where it can be accessed for subsequent computations. Alternatively, it may in some implementations be possible to provide the logarithm result over a forwarding path directly as an input to additional circuitry arranged to use that logarithm result as an input.

There are a number of ways in which the apparatus described with reference to FIG. 3 may be embodied. For example, it may be provided by a dedicated hardware circuit arranged to compute logarithms based on a provided input value, without being associated with any kind of instruction stream. Alternatively, it could be implemented fully in hardware, with the entire logarithm calculation described being encapsulated in a single instruction executed on the hardware.

As a yet further alternative, the apparatus could be embodied as a combination of hardware and software elements, for example where the hardware provides dedicated instructions for the argument reduction and/or the table lookup operations to obtain P and Q, and software then incorporates these instructions into instruction sequences in order to perform the logarithm calculation.

Finally, in an alternative embodiment, the logarithm computation may be performed entirely by software executing on a suitable general purpose computer.

As mentioned earlier, in one embodiment an enhanced precision mode can be provided. In particular, in one embodiment such an enhanced precision mode is provided when computing the logarithm used in the pow (a, b) function identified in FIG. 6. In particular, the $\log_2$ a computation requires a higher precision than would typically be available for regular SP floating point values.

FIG. 6 illustrates how the process of FIG. 1 is adapted to allow for the increased precision. In particular, at step 300, which corresponds with step 4 of FIG. 1, the number of Taylor terms to compute is selected having regard to the required increased precision. This can for example be determined using the circuitry of FIG. 5 to provide the appropriate control signal to the Taylor series computation circuit 120.

Thereafter, at step 305, which corresponds to step 5 of FIG. 1, Kahan summation may be used when computing the result Y in order to keep track of both a sum value and an associated error value, as two floating point values. By tracking the associated error value whilst performing the summation, this effectively increases the precision of the overall result, and has been found to provide a suitable mechanism for providing the required precision for the logarithm result to be used in the pow (a, b) function. It should be noted that this type of summation would not have been possible if the reduction process performed at step 25 had introduced roundoff error.

As mentioned earlier, in one embodiment it is possible to pick the value P such that it is a multiple of $2^{-N}$ with an error bound of $2^{-N}$ for an arbitrary value of N. Using the embodiment described with reference to FIG. 3, this requires a lookup table for P with $2^{N+1}$ elements indexed with the top N+1 bits of x1's fraction portion. The lookup table for Q will have about one third the number of entries as the lookup table for P. Generally, by increasing the value of N, this will cause the Taylor series to converge faster, at the expense of larger lookup tables.

Whilst the above described techniques have been described by way of example with reference to single precision floating point numbers, the method described also works for other floating point formats. For example, the technique readily generalises to FP64 (i.e. double precision) floating point numbers. For double precision numbers, it may be desirable to use larger lookup tables than for the single precision case, in order to limit the length of the required Taylor series computation. Accordingly, a larger value of N may be chosen in such cases. For the enhanced precision mode, it is still possible to use Kahan summation to obtain the logarithm with better than FP64 precision, in the same way as described earlier for single precision values.

Figure 8:
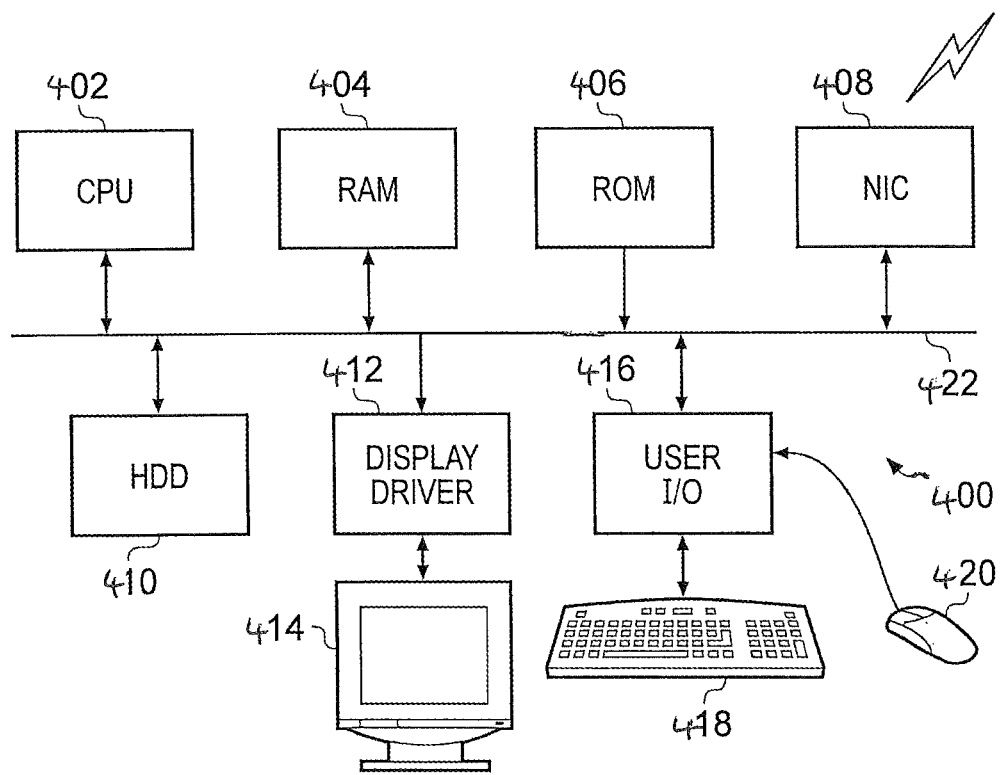
FIG. 8 schematically illustrates a general purpose computer of the type which can be used to implement the present techniques.

FIG. 8 schematically illustrates a general purpose computer 400 of the type that may be used to implement the above described techniques, and in particular the performance of a logarithm function on an input floating point data value. The general purpose computer 400 includes a central processing unit 402, a random access memory 404, a read-only memory 406, a network interface card 408, a hard disk drive 410, a display driver 412 and monitor 414, and a user input/output circuit 416 with a keyboard 418 and mouse 420 all connected via a common bus 422. In operation the central processing unit 402 will execute computer program instructions that may be stored in one or more of the random access memory 404, the read-only memory 406 and the hard disk drive 410, or dynamically downloaded via the network interface card 408. The results of the processing performed may be displayed to a user via the display driver 412 and the monitor 414. User inputs for controlling the operation of the general purpose computer 400 may be received via the user input/output circuit 416 from the keyboard 418 or the mouse 420. It will be appreciated that the computer program could be written in a variety of different computer languages. The computer program may be stored and distributed on a recording medium or dynamically downloaded to the general purpose computer 400. When operating under control of an appropriate computer program, the general purpose computer 400 can perform the above described logarithm function and can be considered to form an apparatus for performing the above described techniques. The architecture of the general purpose computer could vary considerably, and FIG. 8 is only one example.

From the above described embodiments, it will be appreciated that such embodiments take advantage of certain properties of floating point representation and a reduction operation such as a floating point multiply accumulate operation, combined with specially prepared tables, to perform the argument reduction without introducing any roundoff error, and without the requirement for any multi-precision arithmetic. This hence provides a particularly efficient and cost effective solution for performing the logarithm functions that exhibits small relative error for the whole representable input range. Furthermore, when using the described techniques, this allows improved control of error analysis and good numeric stability for calculations for logarithms of values close to 1 at low cost, providing significant benefits when compared with the known prior art techniques.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

I claim:

1. An apparatus comprising:
reciprocal estimation circuitry, responsive to a first floating point value, to determine a second floating point value that is an estimated reciprocal of the first floating point value, the second floating point value having both its magnitude and its error bound constrained in dependence on a specified value N;
argument reduction circuitry to perform an argument reduction operation using the first and second floating point values as inputs, in order to generate a third floating point value;
the use of the specified value N to constrain both the magnitude and the error bound of the second floating point value causing roundoff error to be inhibited in the third floating point value that is generated by the argument reduction operation; and
input adjustment circuitry to perform an adjustment operation on an input floating point value to produce said first floating point value and a scaling factor, the scaling factor being chosen such that the first floating point value is within a specified range, where the boundary values of the specified range are other than 1, and a value of 1 is within the specified range.

2. An apparatus as claimed in claim 1, wherein:
the second floating point value has its magnitude constrained to be a multiple of $2^{-N}$ and has its error bound constrained so as to represent the reciprocal of the first floating point value with an error of less than $2^{-N}$, where N is a positive integer.

3. An apparatus as claimed in claim 1, wherein the argument reduction operation is a multiply-accumulate operation.

4. An apparatus as claimed in claim 3, wherein the argument reduction circuitry comprises fused multiply-accumulate circuitry.

5. An apparatus as claimed in claim 1, further comprising a lookup table storage having a plurality of entries storing floating point values, the reciprocal estimation circuitry being arranged to access an entry in the lookup table storage using specified bits of the first floating point value, and to use the floating point value in said accessed entry to form the second floating point value.

6. An apparatus as claimed in claim 5, wherein the specified bits of the first floating point value used to access the entry are the most significant N+1 bits of a fraction portion of the first floating point value.

7. An apparatus as claimed in claim 1, wherein the value of 1 is a median value within the set of floating point values representable within the specified range.

8. An apparatus as claimed in claim 1, further comprising:
computation circuitry to perform a computation operation using the third floating point value as an input, in order to generate a fourth floating point value; and
logarithm determination circuitry to generate a final result representing a logarithm of the input floating point value using the fourth floating point value as an input.

9. An apparatus as claimed in claim 8, wherein the computation circuitry performs a Taylor series computation, where the number of terms in the Taylor series is dependent on a specified precision for the final result and the specified value N.

10. An apparatus as claimed in claim 9, wherein the computation circuitry is configurable in response to a control signal indicative of the specified precision to perform the Taylor series with an appropriate number of terms for that specified precision.

11. An apparatus as claimed in claim 10, wherein the appropriate number of terms for the Taylor series is dependent on the specified precision and a maximum possible magnitude of the third floating point value.

12. An apparatus as claimed in claim 8, wherein the reciprocal estimation circuitry is further arranged to determine at least one further floating point value representing a logarithm of the second floating point value, said at least one further floating point value forming a further input to the logarithm determination circuitry.

13. An apparatus as claimed in claim 12, wherein the at least one further floating point value represents the logarithm of the second floating point value to an accuracy sufficient to accommodate a worst case specified precision for the final result generated by the logarithm determination circuitry.

14. An apparatus as claimed in claim 12, further comprising an additional lookup table storage referenced by the reciprocal estimation circuitry in order to obtain the at least one further floating point value.

15. An apparatus as claimed in claim 14, wherein the reciprocal estimation circuitry is arranged to access the additional lookup table storage using the determined second floating point value.

16. An apparatus as claimed in claim 8, wherein the scaling factor is provided as a further input to the logarithm determination circuitry.

17. An apparatus as claimed in claim 8, wherein in an enhanced precision mode the logarithm determination circuitry is configured to perform a series of addition operations on input values to the logarithm determination circuitry using Kahan summation, to produce as the final result a sum floating point value representing the sum and an error floating point value representing an error in the sum.

18. An apparatus as claimed in claim 17, wherein the enhanced precision mode is selected when determining as the final result log $2a$, where a is the input floating point value, and the final result is provided for use in the computation $$\mathrm{pow}(a,b)=e^{2(b \times \log 2\, a)}$$

19. A method of inhibiting roundoff error in a floating point argument reduction operation, comprising:
responsive to a first floating point value, determining a second floating point value that is an estimated reciprocal of the first floating point value, and during said determination constraining both a magnitude and an error bound of the second floating point number in dependence on a specified value N; and
employing argument reduction circuitry to perform an argument reduction operation using the first and second floating point values as inputs, in order to generate a third floating point value;
wherein the use of the specified value N to constrain both the magnitude and the error bound of the second floating point value causes roundoff error to be inhibited in the third floating point value that is generated by the argument reduction operation;
the method further comprising performing an adjustment operation on an input floating point value to produce said first floating point value and a scaling factor, the scaling factor being chosen such that the first floating point value is within a specified range, where the boundary values of the specified range are other than 1, and a value of 1 is within the specified range.

* * * * *